US011271927B2

(12) United States Patent
Rehnelt

(10) Patent No.: US 11,271,927 B2
(45) Date of Patent: Mar. 8, 2022

(54) METHODS FOR MULTI-FACTOR ACCESS CONTROL IN ANONYMOUS SYSTEMS

(71) Applicant: SECLOUS GMBH, Fürth (DE)

(72) Inventor: Kai Rehnelt, Fürth (DE)

(73) Assignee: SECLOUS GMBH, Fürth (DE)

( * ) Notice: Subject to any disclaimer, the term of this patent is extended or adjusted under 35 U.S.C. 154(b) by 0 days.

(21) Appl. No.: 17/050,796

(22) PCT Filed: Apr. 26, 2018

(86) PCT No.: PCT/EP2018/060794
§ 371 (c)(1),
(2) Date: Oct. 26, 2020

(87) PCT Pub. No.: WO2019/206420
PCT Pub. Date: Oct. 31, 2019

(65) Prior Publication Data
US 2021/0234856 A1    Jul. 29, 2021

(51) Int. Cl.
*H04L 29/06* (2006.01)
*H04L 29/08* (2006.01)
(Continued)

(52) U.S. Cl.
CPC ...... *H04L 63/0846* (2013.01); *H04L 63/0421* (2013.01); *H04L 63/101* (2013.01);
(Continued)

(58) Field of Classification Search
CPC ... H04L 67/141; H04L 67/42; H04L 63/0846; H04L 63/0421; H04L 63/101
See application file for complete search history.

(56) References Cited

U.S. PATENT DOCUMENTS 8,447,829 B1 * 5/2013 Geller .................. H04L 9/3239
709/217
8,578,036 B1 * 11/2013 Holfelder ............. G06F 16/951
709/228

(Continued)

FOREIGN PATENT DOCUMENTS

DE    102013203257 A1    8/2014
DE    102014106310 A1    11/2015

OTHER PUBLICATIONS

International Application No. PCT/EP2018/060794, International Search Report and Written Opinion dated Jan. 22, 2019, 16 pages.

*Primary Examiner* — El Hadji M Sall
(74) *Attorney, Agent, or Firm* — Kilpatrick Townsend & Stockton LLP

(57) ABSTRACT

The invention relates to methods for storing and finding data of clients which are identifiable by unique client identifiers on a memory device, wherein these data include at least client data identification values which the client assigns arbitrarily to the data, and these data of the client are found on the memory device exclusively by means of these client data identification values. An access control entity is provided which has an adaptable positive list as a listing of the client identifiers of the selected client which, exclusively in a session setup step, beginning with a session start enquiry, obtain a temporary supplementary information item from this access control entity and with this information item can store and find data on the memory device, each temporary supplementary information item losing its validity after a specific time period.

14 Claims, 5 Drawing Sheets

(51) Int. Cl.
   *H04L 67/141* (2022.01)
   *H04L 67/01* (2022.01)
(52) U.S. Cl.
   CPC ............ *H04L 67/141* (2013.01); *H04L 67/42* (2013.01); *H04L 2463/082* (2013.01)

(56) References Cited

U.S. PATENT DOCUMENTS

| | | | |
|---|---|---|---|
| 2004/0117358 A1* | 6/2004 | von Kaenel | G06Q 40/08 |
| 2011/0145589 A1 | 6/2011 | Camenisch et al. | |
| 2014/0134980 A1* | 5/2014 | Singh | H04W 12/084 455/411 |
| 2015/0149622 A1* | 5/2015 | Umanesan | H04L 43/08 709/224 |

* cited by examiner

METHODS FOR MULTI-FACTOR ACCESS CONTROL IN ANONYMOUS SYSTEMS

CROSS-REFERENCE TO RELATED APPLICATIONS

This application is a U.S. national phase of International Patent Application No. PCT/EP2018/060794 filed on Apr. 26, 2018, the contents of which are incorporated herein by this reference.

A multi-factor access control method between at least one client and one server by recourse to an access control instance is hereby disclosed whereby neither party is capable of locating the client's data on the server alone, in the full embodiment of the method not even the server itself.

One aspect of the method is the dispensing with the need for information to identify the client (for anonymization) whereby the access information (input factors) cannot be matched by the client against the values saved on the server, as is usual practice in current systems.

At the current state of the art there are no multi-factor access control methods in use that allow direct access to data, but an attenuated form of this is implemented in the form of multi-factor authentication which supplements the client's input factors (such as a user name and password) with additional factors that the client receives from the server (for example as a temporary SMS code, color code in an application etc.), and after these factors are entered on the client and transmitted to the server, these input factors are matched with the values saved on the server (yes/no check). If the outcome is positive the client is deemed to be authenticated and is granted access to all data. Thus the server must be capable of unambiguously mapping the client to the authentication data stored on the server. Since this matching necessarily entails the server storing sensitive information, at the current state of the art trust in the server and/or its operator is a significant security-related aspect. This issue is heightened since current access control methods may be disengaged or work-arounds found by manipulating the server.

An important concern for many users is that platform operators store as little information about them as possible and do not use this personal data for other purposes such as marketing. This is achieved through the use of anonymous systems.

An anonymous system is characterized in that it does not contain any usable information, in particular so-called metadata (supplementary information, for example regarding users or stored data), dispensing with the need for trust in the server and/or its operator. In order to achieve anonymity, however, authentication of users (and/or clients) for the purpose of granting/preventing access to the data cannot be conducted on a server, since any information on the system is anonymous. At the current state of the art, it is therefore impossible to map or match the data of a specific user/client. The current multi-factor authentication methods cannot therefore be applied, giving rise to the need for the present invention.

The invention thereby replaces the current usual YES/NO cross-check with a method in which client and server must undergo a process that uses identification values for the data that are distinct for client and server (instead of direct access (for the duration of the session, i.e. the temporary logical connection between client and server) being granted to all data once the yes/no check is passed)

whereby all data, actions and transactions are processed via (data) identification values and thus the most effective protection for access control is applied here according to the invention, whereby data identification values from the client, and data identification values from the server, can only be mapped to each other by a third party (access control instance, ACI), whereby a temporary, unique mapping value is generated as interface between the client and the server for each access to a data identification value, whereby the client is incapable of locating its data on the server and the server is incapable of mapping data on the server to a specific client, whereby a client cannot identify any information relating to the access even if it is modified or infected by a hacker, whereby this multi-factor access control method cannot be bypassed by manipulation of client or server due to the mathematical base, whereby a temporary translation/link enabled solely by the ACI is created between client and server via interim values, whereby the ACI possesses a whitelist stating which clients receive mapping values to allow data to be exchanged with the server and whereby the ACI enables centralized access control (in companies, for example) within anonymous systems without the need to monitor each individual transaction, in order for example to be able to monitor data exchange between employees explicitly and thereby implicitly exclude all other (anonymous) users and permit access only under certain conditions, such as at specific times, for specific applications or at specific locations

TYPICAL APPLICATIONS OF THE METHOD

The present invention can, for example, achieve two-factor authentication, which provides a cryptographic added value versus the yes/no check that is currently usual practice. This is achieved by the fact that the user does not know where his/her data can be located since the data identification values that are relevant to him/her do not match those stored by the server.

Another potential embodiment is the condition-based restriction of user access options, via an admin server (access control instance), to their data or data of other employees. This allows, for example, an access control instance to specify that only users with specific IP addresses can access specific data, or that specific users can only access specific data during the company's opening hours. Furthermore, an access control instance can use a whitelist to define users with whom defined users can exchange data, and the conditions that apply to such exchanges. In this case also, this is controlled at the state of the art by permissions, i.e. by a yes/no match, whereby the server checks access permissions using a condition permission list. Cryptographic security can therefore not be achieved at the state of the art. The same advantages of the method listed above apply here too by analogy.

In addition, the present invention allows a modification to Blom's scheme and other comparable methods for anonymous systems to secure temporarily valid symmetrical key exchange using a trusted third party. In this case also, the cryptographic added value applies in that the parties exchanging keys do not need to know their Private Key, and the system only operates with temporary variants of this key.
Added Value and Effects of the Method The method allows the client to work with its own dedicated identification values for its data (client data identification values), however these are different from the identification values of the data on the storage facility (storage facility data identification values) or server. From the client's perspective this difference in the two identification values has no relevance, as it simply places a request and receives a corresponding response to it. The method thus additionally ensures that the server using the storage facility data identification values cannot map the data to specific clients and thus cannot determine any relation between the individual storage facility data identification values (and thus between the stored data).

In no case can the client locate its data on the server until it receives the temporary session client conversion value from the access control instance. A request for ID values would fail to locate a record on the storage facility due to the extremely large numbers used ($2^{128}$-$2^{256}$ bit), since the client's record identification values are not identical to the storage facility's record identification values.

Cryptographic security is further enhanced since the client only receives the data from the server without the identification values—which therefore ensures that the server does not transfer its storage facility conversion base value or any storage facility data identification values to clients. To allow the data to be identified, the server either transfers the data to the client in the sequence requested, or transfers the data together with the session record identification values. The client thus does not receive any information regarding the values on the storage facility, but can readily match the data with its data identification values.

Furthermore, the method allows identification values to be used, with the help of equivalence transformations, to create simple equations whereby the number of decimal places of the selected identification value defines the number of possible solutions of these equations with only one of said solutions allowing the client to locate its data on the server. This conforms to the principle of Cryptographic Security: Possible keys should be capable of being tried out very rapidly, but there should be an extremely high number of possible keys to render brute-force attacks infeasible. ($2^{128}$ is considered to be a future-proof level.)

Under these conditions, these equations can use extremely rapid operations such as the Exclusive Or (XOR) or simple checksums on both the client and server.

Any function can be used provided that it permits equivalence transformations with all numbers used for the variables. In order to ensure sufficient Cryptographic Protection, however, the session ID value must in particular have sufficient entropy and the calculation base must therefore be a random number within a range from 1 to a minimum of $2/\%128$.

Procedure

The client has client data identification values which are constant but must not be known to the access control instance or the storage facility.

The storage facility has storage facility identification values which are constant but must not be known to the access control instance or the client.

It is a requirement that the client data identification values are unambiguously converted to the storage facility data identification values using conversion values that are different for each session. To ensure that an access control instance must always receive a request from the client, an additional session client conversion value is introduced which is linked with the client data identification value. Thus different session data identification values are transmitted at each session instead of the static client data identification value.

To always obtain session conversion values that the client CANNOT calculate alone, it is therefore necessary for the access control instance and the storage facility to share a common secret ("pre-shared secret" or access control instance/storage facility secret.

As a alternative to a pre-shared secret, a "session secret" shared between the storage facility and the access control instance can also be formed by the storage facility contacting the access control instance and sending it a client ID after receiving a connection request from the client. However in this case the access control instance would have to transfer a session storage facility conversion value to the storage facility and a matching session client conversion value to the client. It is important not to overload the storage facility, since it serves a large number of clients which in turn are subject to a large number of access control instances. This embodiment offers no advantages here and has significant disadvantages versus the variant described in claim 1 and is therefore not set out in detail below.

It is important that the session IDs transferred to the client by the storage facility are constantly changing values, since otherwise the client could repeatedly send the same session ID to the storage facility, dispensing with the need for the client to contact the access control instance at the start of every session. If this were the case the access control instance would have no control (logging, condition-based restrictions) over clients connecting to the storage facility.

Similarly, the client can never define the storage facility data identification values mapped on the storage facility to its client data identification values, since the server does not send it these values (and the server itself cannot map its storage facility data identification values to a client). In order to ensure that the client must always contact the access control instance, the client must never be able to identify the client conversion value, since otherwise it would be able to generate the session client conversion value together with the session ID (and would no longer be forced to contact the access control instance).

In order to keep the client conversion value secret from the client, introduction of a three-term equation is required ($a$<operation>$b$=$c$) with session values substituting the terms $a$ and $b$ by equivalence transformation. In a preferred embodiment, due to the speed and equivalent level of security to any other function, an exclusive OR (XOR) is used (this is also used by proxy for simplification purposes in this description):

The client knows the session ID, as do the storage facility/server and the access control instance, since it receives it from the access control instance. However the client does not know the client conversion value or the storage facility conversion value. Once both the access control instance and the storage facility know the storage facility conversion value, they may both form a shared session secret from the storage facility conversion value together with the session ID, provided it is ensured that the client is unable to derive the storage facility conversion value. This is ensured through a secure hash function applied to both of these values. It is also possible, for example, to combine or link these two values (or apply any other form of combination) with an XOR. The use of constant salt values (random character strings) is also possible. Modifying these details does not affect the pre-existing security of the method. The session client conversion guard value is used as temporary guard value to prevent the storage facility or the client discovering the client conversion value. This value can be generated, for example, using a secure hash function which also meets the requirement for high entropy. An XOR (or equivalent function) is applied to the session client conversion guard value and client conversion value to generate the session client conversion value, which the client is then unable to reduce to its original constituent parts since it is a combination of two values that are unknown to the client. Although the session client conversion guard value is different for each session (regardless of its entropy), the client cannot solve this equation with two unknown values, even if it were to collect many different session client conversion values. The number of unknowns in the equations is always one more than the number of equations.

Since the session client conversion guard value must not be contained in the final mapping of the client data identification value to the storage facility data identification value, it is added on both the client and storage facility/server side so that it is canceled out and eliminated. This explains the need for the equivalence transformation and use of a function that permits this.

It is thus declared that symmetric encryption such as AES is not suitable, since it is impossible to find two keys for the AES that apply the same identical encryption to the same data consecutively as two other keys. The same applies to hash functions and other functions that are not suitable for equivalence transformations. Furthermore, an OR or AND is not suitable since these commands destroy information (A OR B for example if 2× TRUE and 2× FALSE is input has the result 3× TRUE and 1× FALSE, and A AND B if 2× TRUE and 2× FALSE is input has the result 1× TRUE and 3× FALSE).

Similar requirements apply to the storage facility (server) since it also must not be capable of calculating the client conversion value or the client data identification values. The client transmits the client data identification values to the server combined (for example using XOR) with the client data identification values, which similarly creates an equation with two unknowns that cannot produce an unambiguous solution.

Even if multiple session data identification values are collected by the client or storage facility, the number of unknowns will always be precisely one more than the number of equations. The session client conversion guard value is added to this XOR to fulfill the equivalence transformation and calculate the guard value.

The client data identification values are therefore saved on the storage facility/server using an XOR to form a secret which is only entirely known to the access control instance. This secret consists of two parts, the client conversion value and the storage facility conversion value.

The access control instance receives no values from the client or the storage facility apart from the client ID and a session ID (random value from the storage facility). This ensures that the access control instance alone cannot generate any information required for access to data.

A secure connection (TLS) is recommended when transferring all values between client, access control instance and storage facility.

As already known under the state of the art, AES encryption or other encryption can also be viewed as a hash function. However since this has disadvantages compared with pure secure hash algorithms, the use of SHA2-256, SHA3-256, Blake2 or other such hash algorithms is recommended. Hashes with 384-bit, 512-bit or other output lengths can also be used without this having any significant impact on the security of the method.

As mentioned earlier, a permutation and/or substitution or other suitable functions can be used instead of XOR.

The details of the transfer are not specified here since they are open to the user and are sufficient well known at the state of the art. For example, the session ID value must be sent with every communication. However this is not shown in the drawings in order to focus on the essence of the invention.

Overview of parties, parameters and abbreviations used in the description of the method

| Parties |
|---|
| CL—client |
| ACI—access control instance |
| SF—storage facility/server |

| Parameter | Short name* | Source** CL | ACI | SF |
|---|---|---|---|---|
| Client ID | S-CI | O | Tr | Tr |
| Whitelist (of clients permitted by the ACI) | WL | | O | |
| Client/access control instance secret | S-CS | | O | |
| Storage facility/access control instance secret | S-SS | | O | |
| Pre-shared access control instance/ storage facility secret | S-ASS | | O/C | Tr |
| Client conversion value | S-CC | | O | |
| Session ID | T-XID | Tr | Tr | O |
| Session client conversion value guard value | T-CCG | | C | C |
| Session client conversion value | T-CC | Tr | C | |
| Session storage facility conversion value | T-SC | | C | C |
| Client data identification value | S-CDI | O | | |
| Session data identification value | T-XDI | C | | Tr |
| Storage facility data identification value | S-SDI | | | C |
| Storage facility conversion value | S-SC | | O | Tr |
| Session storage facility conversion value guard value | T-SCG | | O | |

*Short name
S—static data   C (client)   Con (conversion value)
T—temporary data   S (storage facility)   CG (conversion guard value)

-continued

| | | Short | Source** | | |
|---|---|---|---|---|---|
| Parameter | | name* | CL | ACI | SF |
| | A (access control instance) | ID (identifier) | | | |
| | X (session value) | I (identification value) | | | |

Parties
CL—client
ACI—access control instance
SF—storage facility/server

**O—owner, generates/defines value, C—Calculates the value, Tr—Transmitted values

Figure 1:
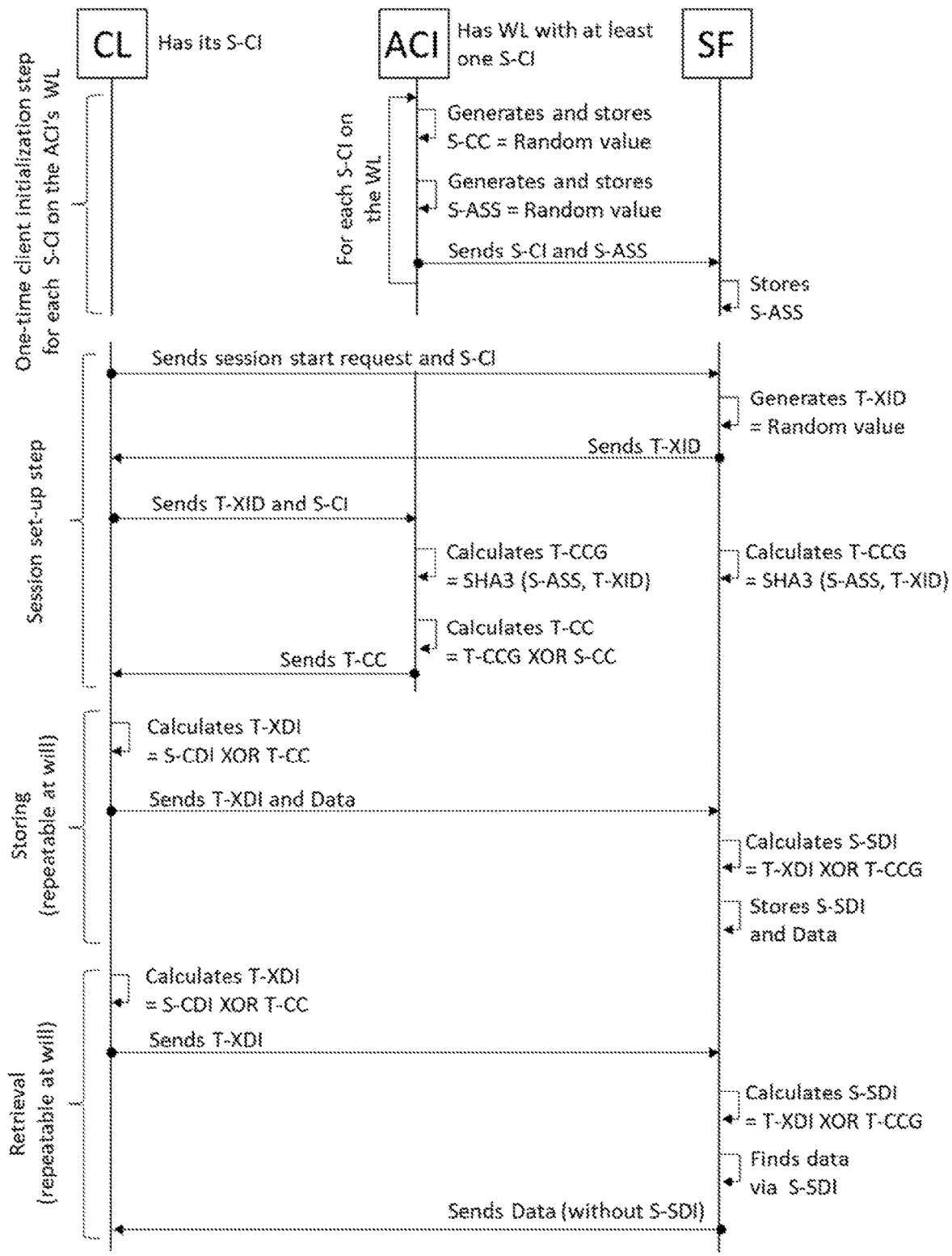
FIG. 1 shows an embodiment of the invention according to claim 1.
Figure 2:
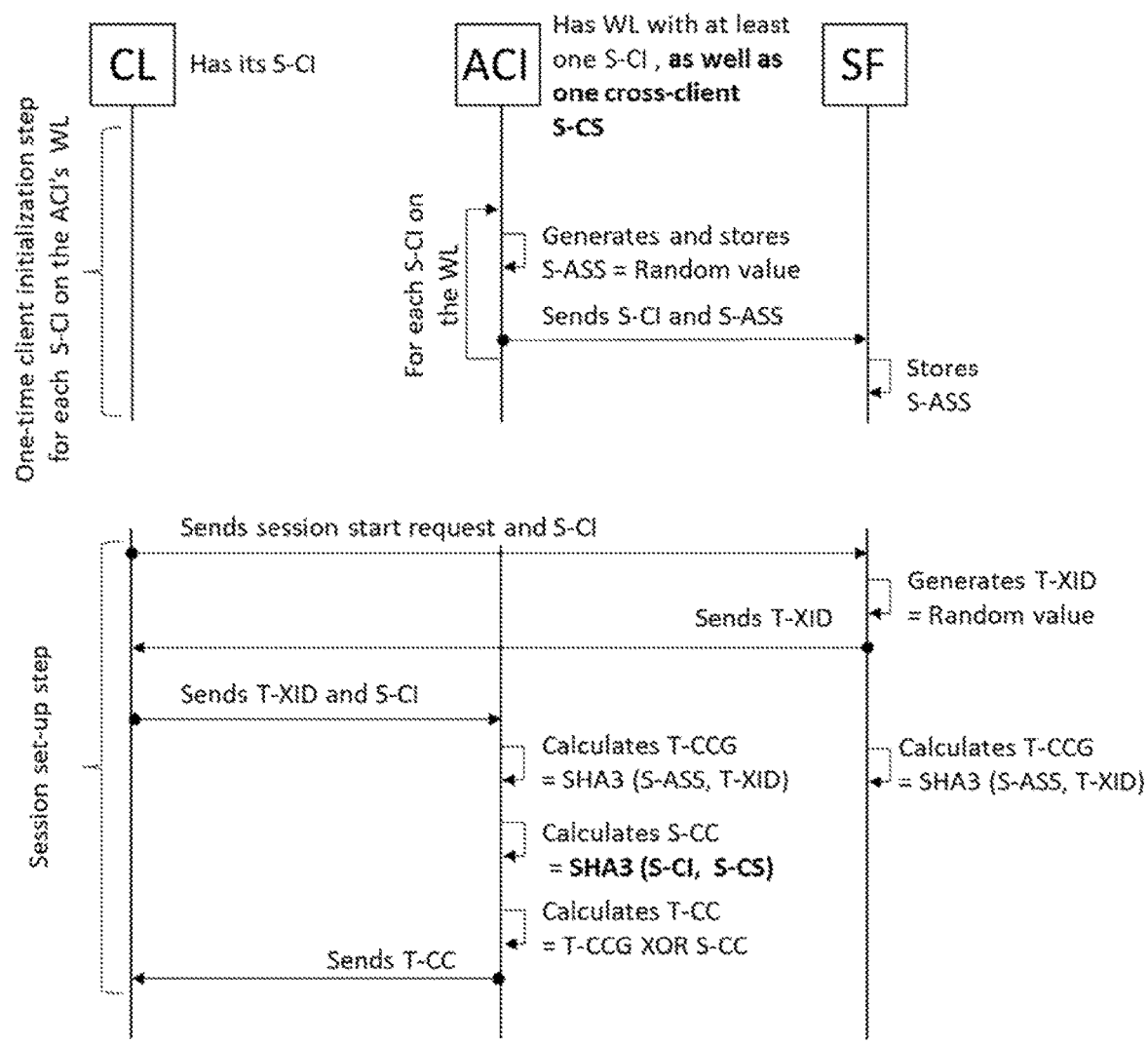
FIG. 2 shows an embodiment of the invention according to claim 2.
Figure 3:
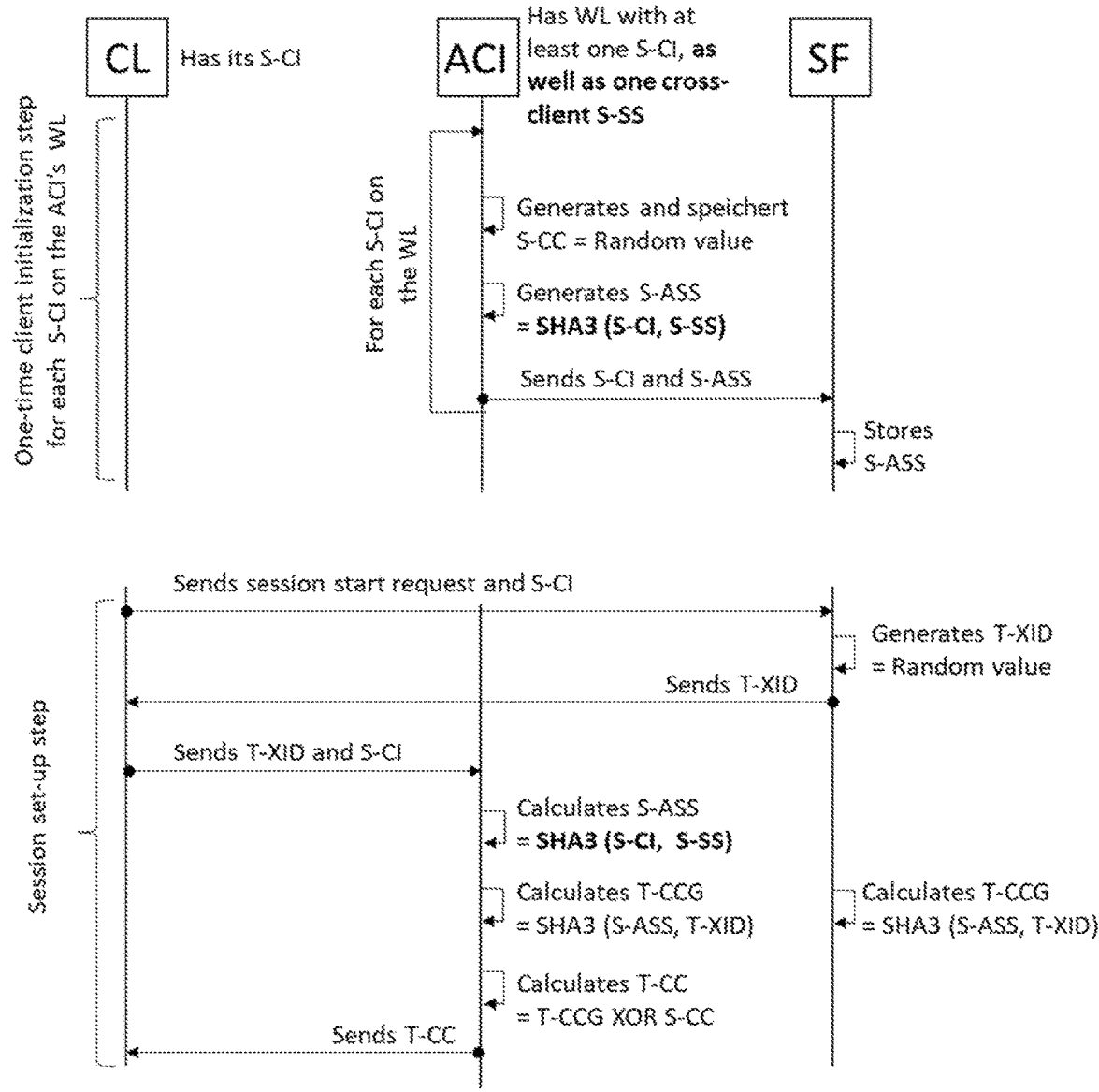
FIG. 3 shows an embodiment of the invention according to claim 3.
Figure 4:
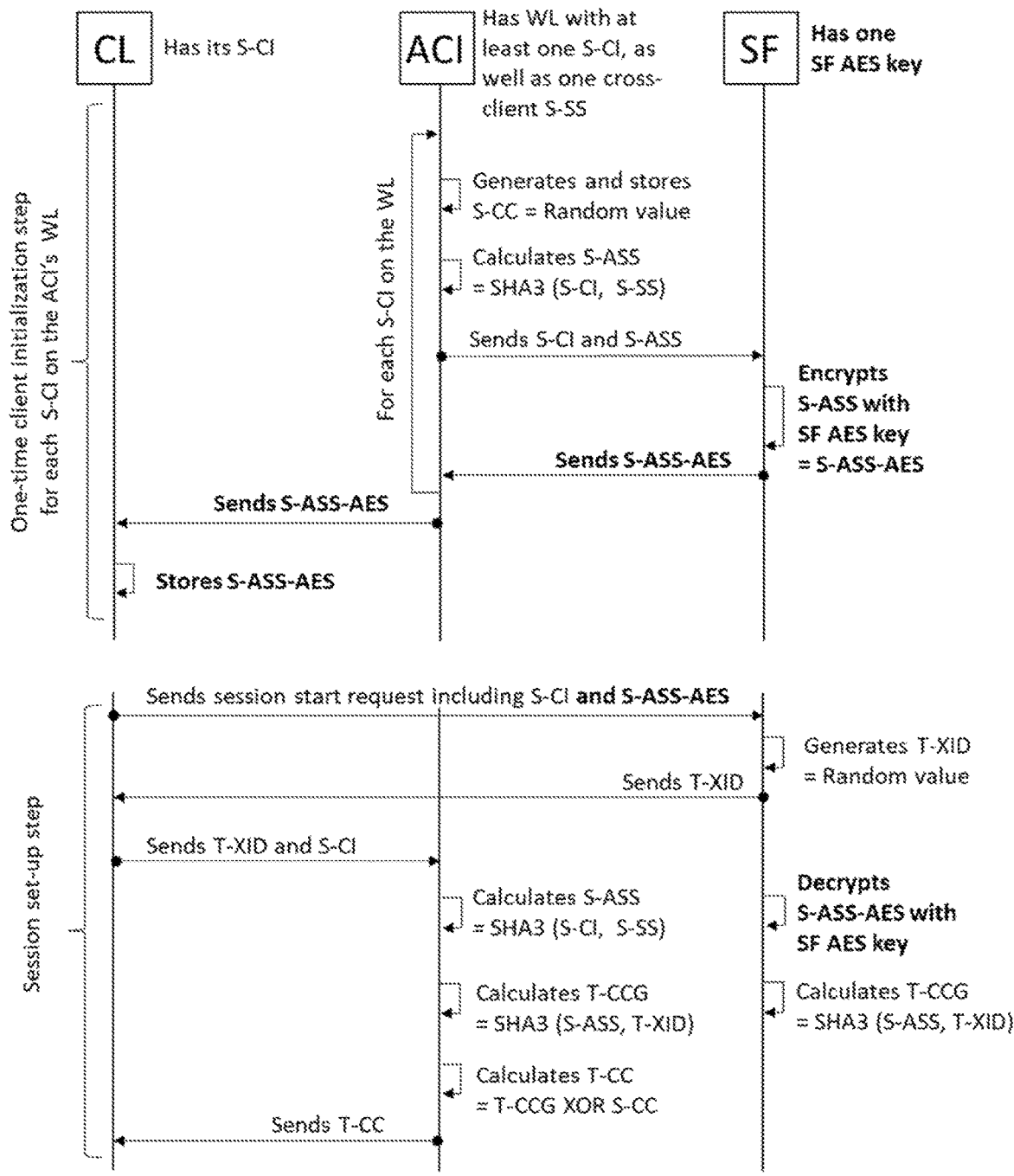
FIG. 4 shows an embodiment of the invention according to claim 4.
Figure 5:
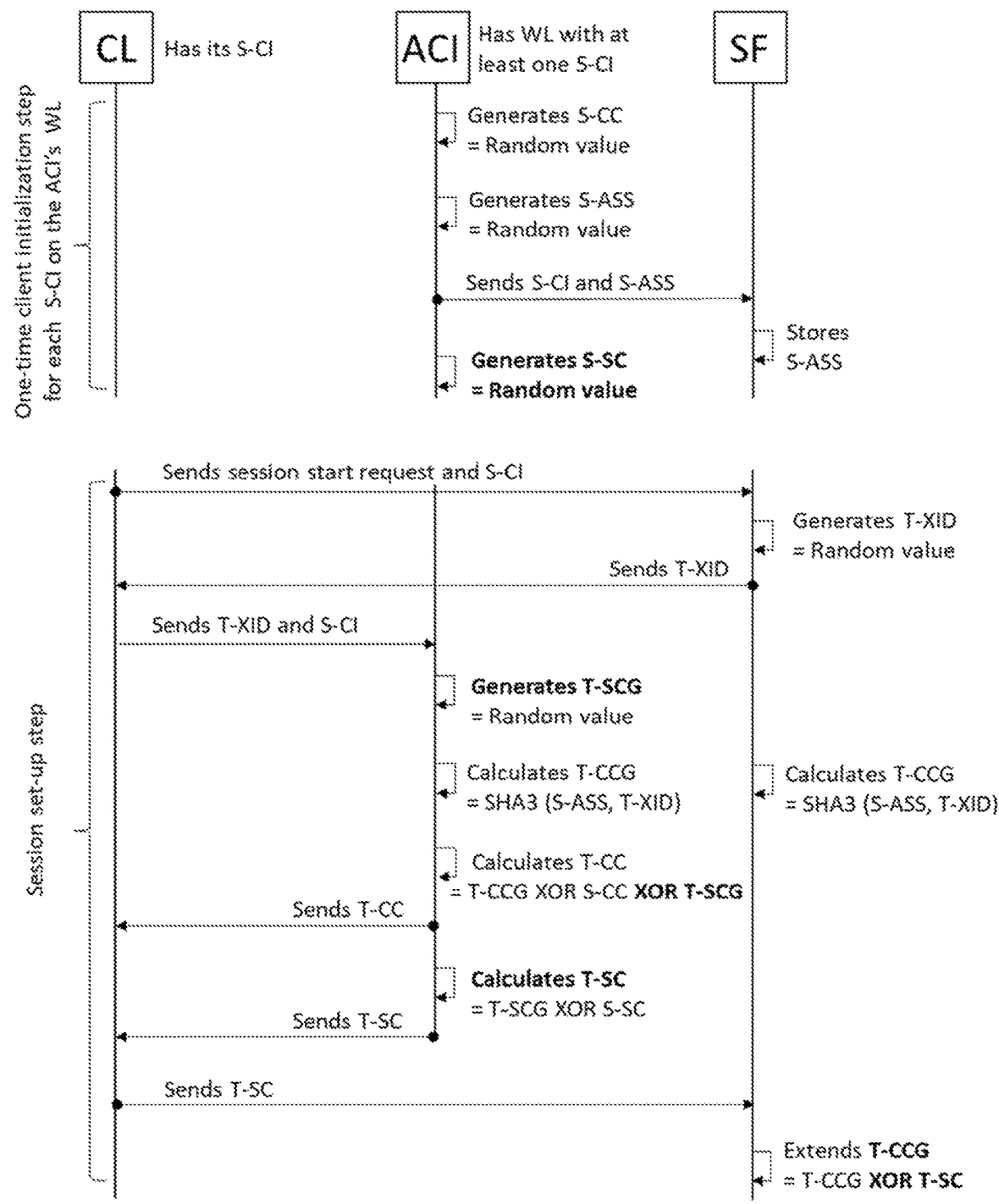
FIG. 5 shows an embodiment of the invention according to claim 5.

The invention claimed is:
1. A method for storing and locating data of a client identifiable by a unique client ID on a storage facility, wherein said data contain at least client data identification values which the client assigns to the data, and wherein the data is located by the client on the storage facility via the client data identification values, and wherein an access control instance is present which has an adjustable whitelist as a listing of client IDs that, in a session set-up step starting with a session start request, receive temporary supplemental information from said access control instance with which the client can store and locate the data on the storage facility, with the temporary supplemental information expiring after a set time, wherein said method comprises:
  selecting an equivalence transformation function from a plurality of equivalence transformation functions suitable for equivalence transformation;
  after selecting the equivalence transformation function, executing an initial client initialization step for each client ID of the client IDs on the whitelist of the access control instance, wherein the client initialization step comprises:
    setting, for the client ID, a shared secret between the access control instance and the storage facility such that both the access control instance and the storage facility can permanently access or calculate the shared secret for the client ID, and
    generating, by the access control instance, a secret client conversion value for the client ID, wherein the access control instance can permanently access or calculate the secret client conversion value;
  sending, by the client, to the storage facility a session start request during the session set-up step in order to obtain temporary supplemental information from the access control instance, wherein the temporary supplemental information is required for the subsequent storage and locating of data and contains at least the client ID;
  in response to sending the session start request, receiving by the client from the storage facility a one-time session ID value, and transferring by the client said one-time session ID value together with the client ID to the access control instance;
  after the access control instance has received the one-time session ID value together with the client ID, respectively calculating, by each of the access control instance and the storage facility, a session client conversion value guard value by applying a secure hash function to at least the shared secret and the one-time session ID value;
  calculating, by the access control instance, a session client conversion value as temporary supplemental information by applying at least the selected equivalence transformation function to the session client conversion value guard value and the client conversion value, and sending the session client conversion value to the client for storage;
  upon receipt of the session client conversion value from the access control instance, calculating, by the client, session data ID values by applying the selected equivalence transformation function to the client data ID values and the session client conversion value, respectively, and sending solely the session data ID values to the storage facility to store or locate the data; and
  setting, by the storage facility, the session client conversion value guard value for the client by applying the selected equivalence transformation function to all session data ID values received from said client and the session client conversion value guard value, either before the data are stored or before the data are located to, determine storage facility data identification values which have a static association with the client data identification values; and
  storing, by the storage facility, the storage facility data identification values together with the data or sending the located data to the client without the storage facility data identification values.

2. The method according to claim 1, wherein the access control instance has a non-volatile client/access control instance secret, which can be any value, and in the client initialization step the client conversion value is generated from a secure hash which is applied at least to the client/access control instance secret and to the client ID so that the access control instance can calculate the client conversion value for any clients without the need to store them.

3. The method according to claim 1, wherein the access control instance has a non-volatile storage facility/access control instance secret, and wherein the client initialization step the shared secret is generated by the access control instance from a secure hash which is applied at least to the storage facility/access control instance secret and to the client ID; and wherein the access control instance transmits the shared secret together with the client ID to the storage facility for non-volatile storage.

4. The method according to claim 1, wherein the storage facility has a cross-client storage facility AES key;
wherein the storage facility, upon receipt of the shared secret from the access control instance, encrypts the shared secret with the cross-client storage facility AES key and transfers the encrypted shared secret to the access control instance; and
wherein the access control instance transfers the encrypted shared secret to the client; and
wherein the client at the session start request sends its the client ID and the encrypted shared secret to the storage facility.

5. The method according to claim 1, wherein the initial client initialization step further comprises:
generating, by the access control instance, a secret storage facility conversion value for the client ID, wherein the access control instance can permanently access or calculate the secret storage facility conversion value; and
after receiving a session ID value together with the client ID in the session set-up step, the access control instance further:
generates a session storage facility conversion value guard value as a random value, and
calculates the session client conversion value as the temporary supplemental information by applying the selected equivalence transformation function to the session client conversion value guard value, the client conversion value and the session storage facility conversion value guard value and sends the session client conversion value to the client for volatile storage, and
calculates the session storage facility conversion value by applying the selected equivalence transformation function to the session storage facility conversion value guard value and the storage facility conversion value and transmits said session storage facility conversion value to the client for transfer to the storage facility;
sending by the client the session client conversion value guard value to the storage facility; and
extending by the storage facility the session client conversion value guard value by applying the selected equivalence transformation function to the session client conversion value guard value and the session storage facility conversion value.

6. The method according to claim 1, wherein the storage facility, upon locating the storage facility data identification values, sends the data and temporary session data ID values to the client.

7. The method according to claim 1, wherein SHA3 is used as the secure hash function and the selected equivalence transformation function comprises an exclusive OR.

8. The method according to claim 1, wherein the selected equivalence transformation function comprises an exclusive OR.

9. The method according to claim 1, wherein storing, by the storage facility, the storage facility data identification values together with the data or sending the located data to the client without the storage facility data identification values ensures that the client cannot store and locate data on the storage facility unless it receives temporary supplemental information from the access control instance.

10. The method according to claim 9, wherein the access control instance can conditionally prevent access to the data by the client by not disclosing the temporary supplemental information.

11. The method according to claim 9, wherein the access control instance can conditionally prevent access to the data by the client by applying validation constraints on the temporary supplemental information.

12. The method according to claim 3, wherein transmitting shared secret together with the client ID to the storage facility for non-volatile storage allows the access control instance to calculate shared secrets for any client ID on the whitelist without the need to store the shared secrets.

13. The method according to claim 4, wherein the storage facility decrypts the shared using the storage facility AES key so that the shared secret calculated by the client is known to the storage facility and is used by the storage facility to generate a session client conversion guard value without the need to permanently store the shared secret and thus instead of a relatively slow search function executes rapid AES encryption.

14. The method according to claim 13, wherein generating the session client conversion guard value without the need to permanently store the shared secret allows the storage facility to execute rapid AES encryption.

* * * * *